C. P. PHILIPPI.
Drilling Machine.
No. 38,981.  Patented June 23, 1863.
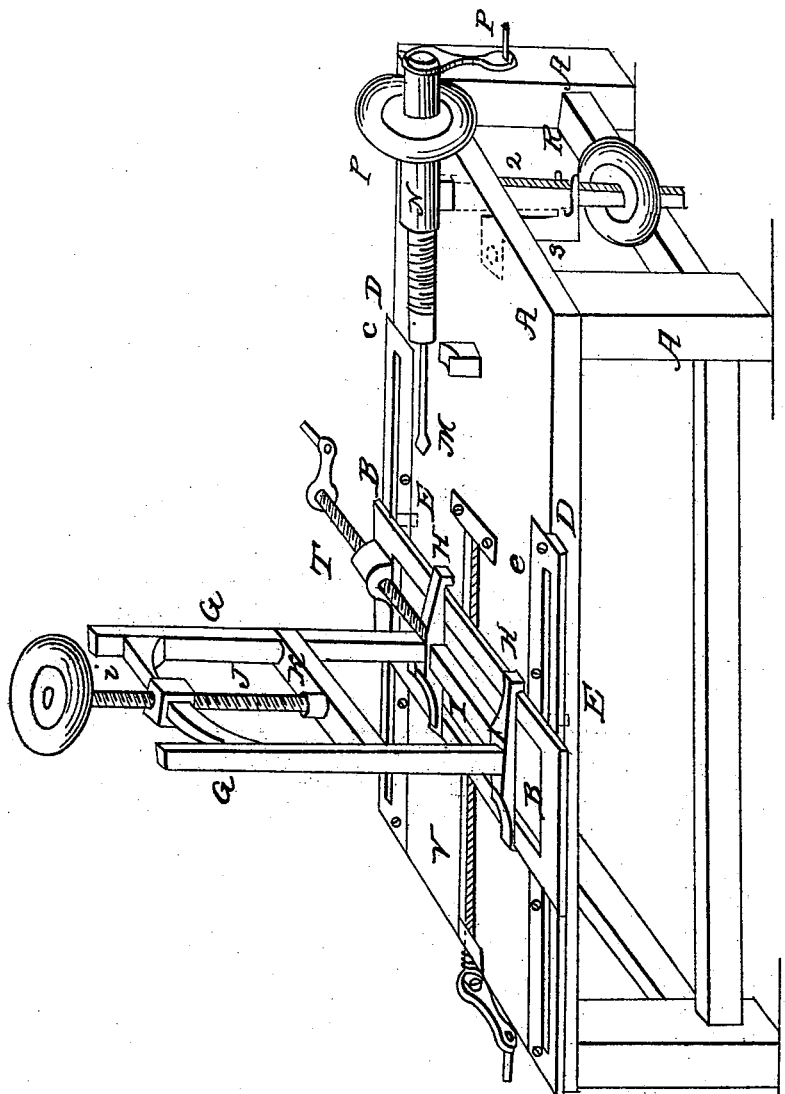
Witnesses
E. W. Bergstresser
Thos. J. Holmes, M.D.
Inventor
Charles P. Philippi
J. Franklin Reigart, Atty.
N. PETERS, Photo-Lithographer, Washington, D. C.

UNITED STATES PATENT OFFICE.

CHARLES P. PHILIPPI, OF CROWN POINT, INDIANA.

IMPROVEMENT IN DRILLING-MACHINES.

Specification forming part of Letters Patent No. 38,981, dated June 23, 1863.

*To all whom it may concern:*

Be it known that I, CHARLES P. PHILIPPI, of Crown Point, Lake county, Indiana, have invented new and useful improvements in drilling-machines to drill and bore holes in plates of metal; and I do hereby declare the following to be a full and exact description thereof, reference being had to the accompanying drawings, and to the letters of reference marked thereon, making a part of this specification.

The nature of my invention consists in the arrangement and combination of an adjustable drill with an adjustable bed-plate and frame.

To enable others skilled in the art to make and use my invention, I will proceed to describe its construction and operation.

A represents the frame or table upon which the devices are erected and operate.

B is a movable and adjustable platform or bed-plate, operating in the grooves C of the side plates, D, which are located on each side of the table A, the bed-plate B having two legs, E, which work and slide in the grooves C. Upon this bed-plate B an upright frame, G, is erected, consisting of two side posts and feet, H, the ends of the feet clasping tightly to the bed-plate B. Near top of frame G is an arched brace, I, through the center of which an upright screw, J, operates and works upon a movable cross-beam, K. This beam K slides on the posts G up and down, the ends of beam K being grooved, so as to fit and work easily against the posts G. A piece of metal to be drilled is placed under the beam K and resting upon a strong cross-piece, L, underneath, and the beam K is then screwed down upon it to hold the plate firmly. The boring chisel or drill M is opposite to the metal to be drilled, and operates horizontally in a screw-cylinder, N, by a lever or wheel, P. It has an adjustable vertical square-shaped screw, Q, which passes through the table A, and by which the cylinder N is raised and lowered. The wheel R and forked brace S assist in keeping the screw Q steady in its upright position.

T represents a set-screw to give the lateral motion to the frame G, so that the metal plate can be bored or drilled accurately at the points required to be drilled; V, the set-screw that moves the platform B backward or forward to add pressure (during the operation of boring the metal) against the movement of the drill M and hold the platform steady.

What I claim as my invention, and desire to secure by Letters Patent, is—

The arrangement and combination of the adjustable square screw Q with cylinder N and drill M, arranged and operating on the table A, with the adjustable bed-plate B, as herein described, for drilling holes in plates of metal.

CHAS. P. PHILIPPI.

Witnesses:
J. FRANKLIN REIGART,
JAMES HICKEY.